(12) United States Patent
Tofighbakhsh et al.

(10) Patent No.: US 10,305,959 B2
(45) Date of Patent: May 28, 2019

(54) SELF-ORGANIZING NETWORK COMMUNICATION

(71) Applicant: AT&T INTELLECTUAL PROPERTY I, L.P., Atlanta, GA (US)

(72) Inventors: Mostafa Tofighbakhsh, Cupertino, CA (US); David R. Wolter, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 111 days.

(21) Appl. No.: 14/567,723

(22) Filed: Dec. 11, 2014

(65) Prior Publication Data
US 2016/0174265 A1   Jun. 16, 2016

(51) Int. Cl.
| | |
|---|---|
| H04L 29/06 | (2006.01) |
| H04W 4/02 | (2018.01) |
| H04W 48/20 | (2009.01) |
| H04W 24/02 | (2009.01) |
| H04W 40/02 | (2009.01) |
| H04W 40/12 | (2009.01) |
| H04W 76/18 | (2018.01) |
| H04W 84/12 | (2009.01) |

(Continued)

(52) U.S. Cl.
CPC .......... *H04L 65/80* (2013.01); *H04L 65/1069* (2013.01); *H04W 4/023* (2013.01); *H04W 24/02* (2013.01); *H04W 40/02* (2013.01); *H04W 40/12* (2013.01); *H04W 48/20* (2013.01); *H04W 76/18* (2018.02); *H04W 24/04* (2013.01); *H04W 84/12* (2013.01); *H04W 84/18* (2013.01)

(58) Field of Classification Search
None
See application file for complete search history.

(56) References Cited

U.S. PATENT DOCUMENTS

| | | |
|---|---|---|
| 6,678,250 B1 | 1/2004 | Grabelsky et al. |
| 6,804,240 B1 | 10/2004 | Shirakawa et al. |
| 6,839,356 B2 | 1/2005 | Barany et al. |

(Continued)

FOREIGN PATENT DOCUMENTS

| | | |
|---|---|---|
| WO | 2007128235 A1 | 11/2007 |
| WO | 2009125145 A1 | 10/2009 |

(Continued)

OTHER PUBLICATIONS

Broadband Forum "TR-069 CPE WAN Management Protocol" a technical report referenced in the NEC reference which was used in the rejection of claims 11 and 15, dated Nov. 2013, retrieved from https://www.broadband-forum.org/technical/download/TR-069_Amendment-5.pdf.*

(Continued)

*Primary Examiner* — Jamaal R Henson
(74) *Attorney, Agent, or Firm* — Toler Law Group, PC

(57) ABSTRACT

A method includes after determining that a first type of communication path to a self-organizing network controller is not available at an access point that supports a first wireless local area network, selecting, by an agent application at the access point, a second type of communication path to the self-organizing network controller from a prioritized set of communication paths. The method also includes attempting to establish a communication connection to the self-organizing network controller using the second type of communication path.

18 Claims, 4 Drawing Sheets

(51) Int. Cl.
*H04W 24/04* (2009.01)
*H04W 84/18* (2009.01)

(56) References Cited

U.S. PATENT DOCUMENTS

| | | | |
|---|---|---|---|
| 7,400,901 B2 | 7/2008 | Kostic et al. | |
| 7,940,735 B2 | 5/2011 | Kozisek et al. | |
| 8,116,285 B1 | 2/2012 | Barnum | |
| 8,125,917 B2 | 2/2012 | Bevan et al. | |
| 8,402,289 B2* | 3/2013 | Maciocco | H04W 52/0206 713/150 |
| 8,447,314 B2* | 5/2013 | Grayson | H04W 16/04 455/452.1 |
| 8,799,993 B1 | 8/2014 | Efrati et al. | |
| 8,804,622 B1 | 8/2014 | Thai et al. | |
| 9,332,510 B2* | 5/2016 | Damnjanovic | H04W 24/02 |
| 2003/0021251 A1* | 1/2003 | Moshiri-Tafreshi | H04W 24/04 370/338 |
| 2005/0254449 A1 | 11/2005 | Halfmann et al. | |
| 2006/0104263 A1 | 5/2006 | Krishnan et al. | |
| 2009/0312022 A1* | 12/2009 | Viorel | H04W 4/20 455/436 |
| 2010/0034180 A1* | 2/2010 | Zhu | H04W 4/02 370/338 |
| 2010/0110885 A1* | 5/2010 | Qin | H04L 41/00 370/228 |
| 2010/0138549 A1 | 6/2010 | Goel et al. | |
| 2010/0299419 A1* | 11/2010 | Ramankutty | H04W 24/02 709/221 |
| 2011/0105139 A1* | 5/2011 | On | H04W 16/10 455/453 |
| 2011/0151886 A1* | 6/2011 | Grayson | H04W 16/04 455/452.1 |
| 2011/0176424 A1* | 7/2011 | Yang | H04L 41/0803 370/236.2 |
| 2012/0020307 A1 | 1/2012 | Henderson et al. | |
| 2012/0026865 A1* | 2/2012 | Fan | H04W 24/00 370/225 |
| 2012/0208504 A1* | 8/2012 | Song | H04W 12/06 455/411 |
| 2012/0265913 A1 | 10/2012 | Suumaki et al. | |
| 2012/0307630 A1* | 12/2012 | Markwart | H04L 41/08 370/228 |
| 2012/0307697 A1* | 12/2012 | Mukhopadhyay | H04W 4/001 370/311 |
| 2013/0044635 A1 | 2/2013 | Suzuki | |
| 2013/0143542 A1* | 6/2013 | Kovvali | H04W 48/18 455/418 |
| 2014/0092742 A1* | 4/2014 | Chou | H04W 4/70 370/235 |
| 2014/0120932 A1 | 5/2014 | Carmon | |
| 2014/0177613 A1 | 6/2014 | Baker et al. | |
| 2014/0214940 A1 | 7/2014 | Hill et al. | |

FOREIGN PATENT DOCUMENTS

| | | |
|---|---|---|
| WO | 2010132826 A2 | 11/2010 |
| WO | 2011053611 A1 | 5/2011 |
| WO | 2012109936 A1 | 8/2012 |
| WO | 2014084475 A1 | 6/2014 |

OTHER PUBLICATIONS

NEC "Self-Organizing Network—NEC's proposal for next-generation radio network management" Feb. 2009, retrieved from http://pt.nec.com/pt_PT/en/global/solutions/nsp/lte/pdf/son.pdf on May 26, 2016.*

NEC "Self-Organizing Network—NEC's proposal for next-generation radio network management" Feb. 2009, retrieved from http://pt.nec.com/pt_PT/en/global/solutions/nsp/lte/pdf/son.pdf on May 26, 2016 (Year: 2016).*

Akyildiz, I., et al. "NeXt generation/dynamic spectrum access/cognitive radio wireless networks: A survey", Computer Networks: The International Journal of Computer and Telecommunications Networking, vol. 50, Issue 13, Sep. 15, 2006, Elsevier North-Holland, Inc., New York, NY, pp. 2127-2159.

Hardison, N., "Client Mode Wireless", Retrieved from http://wiki.openwrt.org/doc/howto/clientmode, May 8, 2008, 7 pages.

Heinzelman, W., et al., "Adaptive Protocols for Information Dissemination in Wireless Sensor Networks", Proceedings of the 5th Annual ACM/IEEE International Conference on Mobile Computing and Networking, ACM, New York, NY, Aug. 1999, pp. 174-185.

* cited by examiner

SELF-ORGANIZING NETWORK COMMUNICATION

I. FIELD

The present disclosure is generally related to a self-organizing network (SON) communication.

II. DESCRIPTION OF RELATED ART

Mobile communication providers, such as cellular data providers, may utilize self-organizing network (SON) controllers to setup and maintain wide area wireless networks. For example, a SON controller may be utilized to control configuration settings associated with base stations such as NodeB stations of a Long Term Evolution (LTE) network. Due to increases in demand, wireless hotspots of local area networks can be utilized to offload some demand from wireless wide area networks; however, identifying resources and configuring resources to offload demand can be challenging.

III. BRIEF DESCRIPTION OF THE DRAWINGS

IV. DETAILED DESCRIPTION

Controlling "hotspots" of wireless local area networks (e.g., "WiFi" hotspots) along with base stations of wireless wide area networks using a SON controller can improve performance of a wireless wide area network and can improve customer satisfaction associated with data demands. However, setting up wireless local area networks using access points may be demanding when a large number of access points are utilized to offload capacity from the wireless wide area network. Accordingly, methods to facilitate automated setup or configuration of access points to establish communications with a SON controller may simplify setup and operation of wireless local area networks, especially in the context of combined control of wireless local area network access points (or hotspots) and wireless wide area network base stations.

Figure 1:
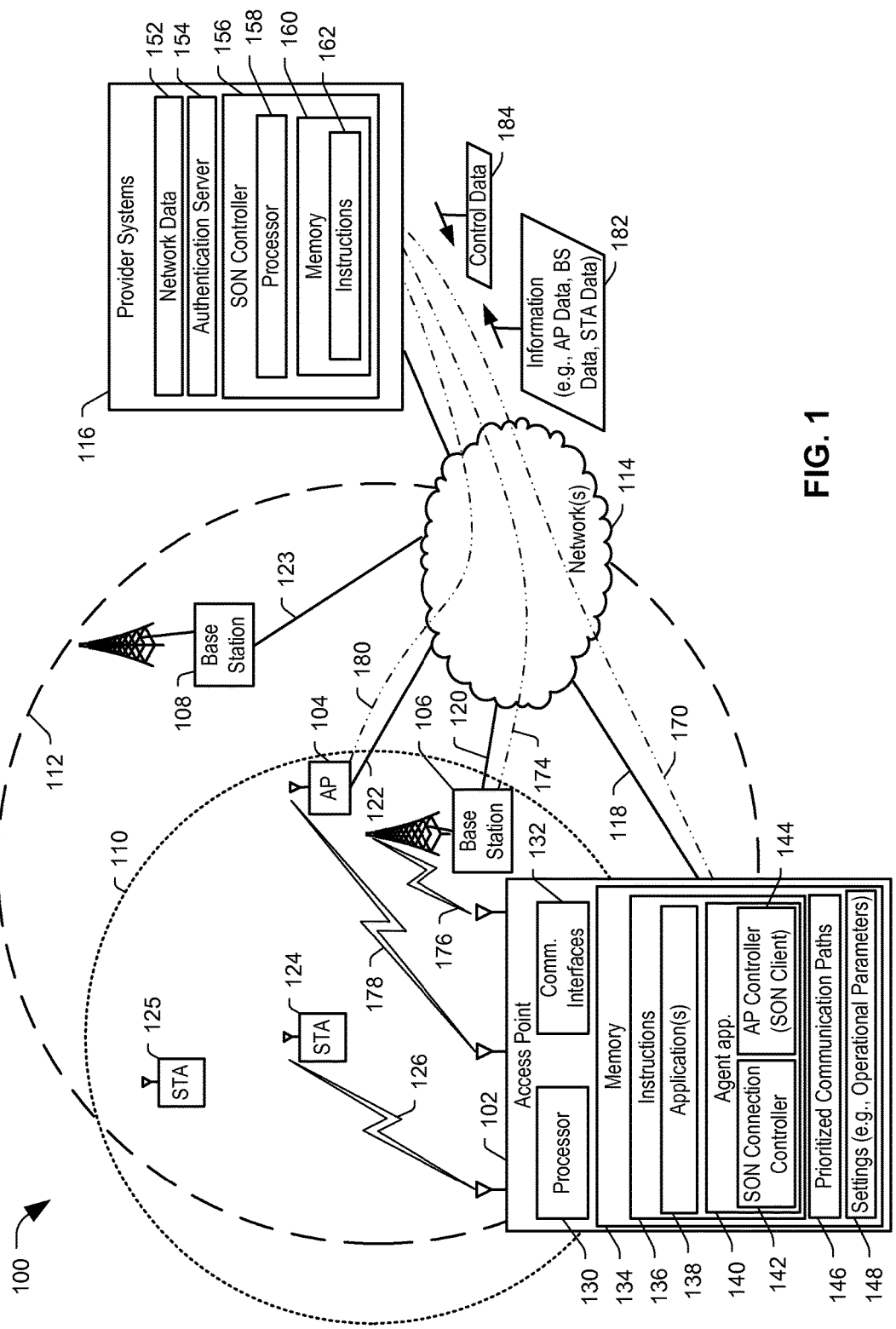
FIG. 1 is a block diagram of a particular embodiment of a system that includes one or more access points and one or more base stations that are controlled via a SON controller.

Referring to FIG. 1, a block diagram of a particular embodiment of a system that includes one or more access points and one or more base stations that are controlled via a SON controller is disclosed and generally designated 100. In FIG. 1, for purposes of illustration, the system 100 may include a first access point 102 and a second access point 104. Although only two access points 102 and 104 are illustrated, the system 100 may include more than two access points. The system 100 also includes a first base station 106 and a second base station 108. Although only two base stations 106 and 108 are illustrated in FIG. 1, the system 100 may include more than two base stations.

The access points 102, 104 and the base stations 106, 108 may be coupled via one or more networks 114 to a provider system 116. The provider system 116 may include a SON controller 156. The SON controller 156 may be configured to control operation of the base stations 106, 108 and the access points 102, 104 in a combined manner in order to manage communication services to one or more stations, such as a stations 124, 125. A station, such as a stations 124, 125, may denote a user of wireless resources of one of more wireless networks and may include a cell phone, smart phone, tablet, laptop, or other wireless communication device. Each of the access points 102, 104 may be associated with a respective wireless coverage area in which the access point supports a wireless local area network. For example, the first access point 102 may be associated with a coverage area 110 in which the first access point 102 supports a wireless local area network, such as an Institute of Electrical and Electronics Engineers (IEEE) 802.11 network. Additionally, each of the base stations 106, 108 may be associated with a coverage area. For example, the first base station 106 may be associated with a coverage area 112 in which the first base station 106 supports a wireless wide area network, such as a 3rd Generation Partnership Project Long-Term Evolution (3GPP LTE) network or a 3GPP Evolved Universal Terrestrial Access (EUT) network.

The base stations 106, 108 and the access points 102, 104 may be coupled to the provider systems 116 and/or to one another via wired connections. For example, the first access point 102 may be coupled to the network 114 via a wireline connection 118. As another example, the second access point 104 may be coupled to the network 114 via the wireline connection 122. The base station 106 may be coupled to the network 114 via the wireline connection 120 and the base station 108 may be coupled to the network 114 via a wireline connection 123. Each wireline connection may include wires (e.g., twisted pairs or un-twisted pairs), cables (e.g., coaxial cables), fibers (e.g., optical fibers), or other physical communication media.

To facilitate operation of the access points 102, 104 with the provider systems 116, each access point 102, 104 may include an agent application 140. The agent application 140 may include a SON connection controller 142 and an access point controller 144 (e.g., SON client). The agent application 140 may correspond to instructions 136 stored at a memory 134 of the access point 102. The instructions 136 may be executable by a processor 130 of the access point 102 in order to facilitate communication between the access point 102 and the SON controller 156 of the provider systems 116. The agent application 140 may be pre-loaded into the access point 102 by a service provider, may be downloaded by the access point 102, or may be loaded into the access point 102 by a user or a technician of the access point 102. The agent application 140 may be started during a boot-up process of the access point 102 or by a command from a user of the access point 102. The agent application 140 may be modified by an application update provided by the SON controller 156 or by an application update downloaded by the access point 102. The agent application 140 may be programmable by the SON controller 156 or by commands from the user or an administrator of the access point 102.

Additionally, the access point 102 may include multiple communication interfaces 132. For example, the access point 102 may include a wireline communication interface associated with coupling the access point 102 via the wireline connection 118 to the provider systems 116. The wireline communication interface may include an Ethernet interface, a fiber-optic interface, or another wireline or optical communication interface or connection. Additionally, the communication interfaces 132 may include one or more wireless interfaces, such as a wireless communication interface configured to support the wireless local area network associated with the access point 102. Additionally, the communication interfaces 132 may include one or more other wireless communication interfaces, such as an interface configured to communicate with one of the base stations 106 or 108 via a corresponding wireless wide area network.

The access point 102 may also include other applications 138, such as applications, that when executed by the processor 130, perform operations that facilitate communications between the access point 102 and the stations 124, 125, between the access point 102 and one or more other access points or base stations, or between the access point 102 and other devices that are accessible via the network 114, such as the provider systems 116 or remote communication servers, such as an internet website server. One or more of the applications 138 may be executable at the access point 102 to support access point communications, or to support an encryption process used by the access point 102. The access point 102 may operate according to one or more settings 148 that identify particular operational parameters of the access point 102. For example, the settings 148 may include information indicating a transmitter or transceiver power to be used by the access point 102. The settings 148 may also include a communication protocol or protocols to be utilized by the access point 102 to support the wireless local area network.

The access point 102 may also include data identifying a prioritized set of communication paths 146. The prioritized set of communication paths 146 may be data elements accessed by the access point 102, commands executable by the access point, settings established by a user or settings established by a service provider associated with the network 114. The prioritized set of communication paths 146 may include utilized by the access point 102 during startup or configuration of the access point 102 in order to establish communications with the SON controller 156. Thus, the access point 102 may be able to automatically setup or establish communications with the SON controller 156 via a variety of different communication paths based on the prioritized set of communication paths 146. To illustrate, when the access point 102 attempts to establish communications with the SON controller 156, the access point 102 may prioritize communications via the wireline connection 118 based on the prioritized set of communication paths 146. If no wireline connection 118 is available (e.g., if no Ethernet connection is coupled to the access point 102), the access point 102 may select a different communication path from the prioritized set of communication paths 146. For example, the access point 102 may attempt to establish a communication path 174 via a wireless connection 176 to the first base station 106. As another example, the access point 102 may attempt to establish a communication path 180 via a wireless connection 178 to another access point (e.g., the second access point 104). Thus, the access point 102 may be configured to automatically establish communication with the SON controller 156 to facilitate setup and management of a combined wireless wide area network and wireless local area network.

After establishing communications with the SON controller 156, the access point 102 may gather information (e.g., via the access point controller 144) and send the information to the SON controller 156 via the established communication connection with the SON controller 156. The SON controller 156 may analyze data received from the access point 102 as well as data received from other access points (e.g., second access point 104) and base stations (e.g., the base stations 106, 108) and generate control data 184. The control data 184 may be sent to any device. For example, the control data 184 for the access point 102 may be sent via communication connection 170 to the access point 102. The access point controller 144 may analyze the control data 184 and take action based on the control data 184. For example, the control data 184 may indicate to modify a setting 148 associated with the access point 102, in which case the access point controller 144 may modify the setting 148 in the memory 134 such that the access point 102 operates according to the modified setting 148. As another example, the control data 184 may be directed to one or more stations, such as the stations 124, 125 that are coupled to the access point 102 via the wireless local area network. In this example, the access point controller 144 may cause the control data 184, or a portion of the control data 184, that is directed to the station 124, to be transmitted to the station 124 via one or more communication interfaces 132 associated with the wireless local area network.

When the access point 102 establishes a communication connection to the SON controller 156 via an untrusted communication device (e.g., such as the second access point 104), the access point 102 may attempt to authenticate or authorize the untrusted communication device. For example, when the first access point 102 does not have information indicating that the second access point 104 is an authorized or authenticated access point, after establishing the communication connection 180 with the SON controller 156 via the second access point 104, the first access point 102 may attempt to authenticate the second access point 104 via an authentication server 154 of the provider systems 116. To illustrate, the access point 102 may transmit identification information associated with the second access point 104 to the authentication server 154. The authentication server 154 may access network data 152 to determine whether the second access point 104 is authenticated.

During operation, when the first access point 102 starts the agent application 140, the agent application 140 may activate the SON connection controller 142 to attempt to establish a communication connection to the SON controller 156. In a particular embodiment, the agent application 140 may be started during a setup operation of the access point 102 or during a power up operation of the access point 102. The SON connection controller 142 may determine which communication interfaces of the communication interfaces 132 are available for communication. For example, the SON connection controller 142 may determine whether a wired connection is coupled to an Ethernet communication interface of the set of communication interfaces 132. As another example, the SON connection controller 142 may determine whether a base station (e.g., base station 106) associated with a wireless wide area network is detected via a wireless communication interface of the set of communication interfaces 132. As another example, the SON connection controller 142 may determine whether a wireless local area network associated with the second access point 104 is detected via a wireless communication interface of the set of communication interfaces 132.

The SON connection controller 142 may access the prioritized set of communication paths 146. The prioritized set of communication paths 146 may indicate which communication path of the set of available communication paths is preferred. For example, the communication path 170 associated with the wireline connection 118 may be preferred. However, when the SON connection controller 142 determines that the wireline connection 118 is not available (e.g., no wired connection is coupled to an Ethernet communication port), the SON connection controller 142 may select a different communication path from the set of prioritized communication paths 146 to attempt to establish the communication connection to the SON controller 156. In a particular example, the prioritized communication paths 146 may indicate that the next preferred communication path is the wireless wide area network. Accordingly, the access point 102 may attempt to establish the communication connection associated with the communication path 174 to the SON controller 156 via the first base station 106. If the communication connection associated with the communication path 174 is established via the base station 106, the access point 102 may send information 182 to the SON controller 156 via the communication path 174. In this example, the information 182 may include access point data generated by the access point 102 or other information associated with the access point 102. However, if the communication connection associated with the communication path 174 is not established (e.g., if the base station 106 does not accept a request from the access point 102 to establish the communication connection), the access point 102 may attempt to establish an alternate connection, such as a connection associated with the communication path 180 via the second access point 104.

After a communication path (e.g., the communication paths 170, 174, or 180) is established, the access point controller 144 may gather data associated with the access point 102, such as access point data indicating load or demand associated with the wireless local area network supported by the access point 102, quality of service parameters associated with the wireless local area network supported by the access point 102, signal strength information (e.g., as indicated by the one or more stations 124, 125 associated with the wireless local area network), applications in use by stations in communication with the access point 102 (e.g., stations 124, 125), access patterns of stations associated with the wireless local area network (e.g., whether the stations are primarily utilizing voice data or text communications), rates of communications, and so forth. The access point 102 may transmit the access point data and other information associated with the access point 102 as the information 182 to the SON controller 156.

Additionally, the second access point 104 may generate second access point data associated with the second access point 104 based on an agent application operating at the second access point 104. The second access point 104 may transmit the second access point data associated with the second access point 104 and other information (e.g., as the information 182) to the SON controller 156. Further, the base stations 106, 108 may generate base station data and station data (e.g., data associated with a station, such as station 124) and may transmit the base station data, the station data and other information (e.g., as the information 182) to the SON controller 156.

The SON controller 156 may include a processor 158 and a memory 160 accessible to the processor 158. The memory 160 may include instructions 162 that are executable by the processor 158 to perform operations at the SON controller 156. For example, the SON controller 156 may be configured to receive the information 182 from the access point 102, from other access points (e.g., the second access point 104), from one or more base stations (e.g., the first base station 106 or the second base station 108), or from a combination thereof In a particular embodiment, the SON controller 156 may be configured to communicate with a master "hotspot" controller (not shown) that may control one or more of the access points (e.g., the access points 102 or 104) of a wireless network of hotspots. For example, the SON controller 156 may alternatively receive the information 182 from one or more of the access points 102, 104 via the master "hotspot" controller. In this example, the SON controller 156 may transmit control data 184 to one or more of the access points 102, 104 via the master "hotspot" controller.

The SON controller 156 may be configured to analyze the information 182 received from the various access points and base stations and to generate the control data 184 based on the analysis. The control data 184 may cause one or more of the access points (e.g., access points 102 or 104), one or more of the base stations (e.g., base stations 106 or 108) or one or more of the stations (e.g., stations 124 or 125) to modify operational parameters or settings, to execute an application, or to perform other activities or operations of the combined wide area and local area networks associated with the SON controller 156.

Examples of operations that may be performed by the base stations 106, 108 based on the control data 184 include selecting particular antennae organizations (e.g., using a single antenna or multiple antennas), utilizing particular transmitter power, utilizing particular communication protocols, utilizing beam-forming to directionally transmit data or receive data, etc. Examples of operations that may be performed by the access points 102, 104 based on the control data 184 include selecting particular antennae organizations (e.g., using a single antenna or multiple antennas), utilizing particular transmitter power, utilizing particular communication protocols, utilizing beam-forming to directionally transmit data or receive data, etc. Examples of operations that may be performed by stations (e.g., the stations 124, 125) responsive to the control data 184 include executing one or more applications (e.g., a station monitoring application or a station reporting application), selecting particular antennae organizations, utilizing particular transmitter power, utilizing particular communication protocols, utilizing beam-forming to directionally transmit data or receive data, etc.

Other operations that may be performed by stations responsive to the control data 184 may include switching from communicating via a wireless wide area network (e.g., the wireless wide area network supported by the first base station 106) to communicating via a wireless local area network (e.g., the wireless local area network supported by the first access point 102) or switching from communicating via a wireless local area network (e.g., the wireless local area network supported by the first access point 102) to communicating via a wireless wide area network (e.g., the wireless wide area network supported by the first base station 106). Additional operations that may be performed by stations responsive to the control data 184 may include changing from communicating via a first access point (e.g., the access point 102) to communicating via a second access point (e.g., the access point 104), changing an operational parameter of a particular application (e.g., an encryption parameter, a data-communication-rate parameter such as a frame rate, etc.), terminating an application executing at the station (e.g., station 124), or any combination thereof.

Changing one or more device operational parameters, device settings, or the execution of an application at devices (e.g., the base stations, access points, or stations) based on the control data 184 may enable automatic configuration of one or more devices associated with the SON controller 156. For example, changes in parameters or settings of one or more access points (e.g., the access points 102 and 104) based on the control data 184 from the SON controller 156 may enable automatic configuration of the one or more access points. The automatic configuration may be based on certain conditions, such as network load, time of day, or other demands (e.g., device processing demands or network processing demands). Access point parameter changes may facilitate the automatic discovery of access points by the SON controller 156. For example, an access point introduced to a network of "hotspots" (e.g., a network of one or more access points) associated with the SON controller 156 may undergo parameter changes (e.g., the initialization of parameters or settings) associated with network introduction.

The control data 184 generated by the SON controller 156 may include policy enforcement information for managing network access, data, and services between the network 114 and one or more devices (e.g., access points, base stations, or stations). For example, the policy enforcement information may include policy and charging rules of a policy and charging rules function (PCRF) associated with the SON controller 156. To illustrate, the SON controller 156 may be configured to transmit policy information to a master "hotspot" controller (not shown) that controls one or more of the access points (e.g., the access points 102 or 104) of a wireless network of hotspots. The master "hotspot" controller may distribute, enforce, or distribute and enforce the policy information among the one or more access points of a wireless network of hotspots.

The SON controller 156 may utilize the received information 182 and control data 184 to establish a dynamic "super channel" between one or more stations (e.g., stations 124 or 125) and the wireless networks (e.g., one or more wireless wide area networks and one or more wireless local area networks) to facilitate load balancing of network data. For example, the station 124 may have access to and may be capable of receiving data from both the wireless wide area network (via a wireless connection to base station 106) and the wireless local area network (via a wireless connection to access point 102). In this example, the SON controller 156 may establish a dynamic "super channel" in which data to and from the station 124 may proceed dynamically through either the wireless wide area network or the wireless local area network. The SON controller 156 may utilize the received information 182 and other information to determine network loading of the wireless networks. Based on the determined network loading, the SON controller 156 may transmit control data 184 to the station 124 to cause the station to dynamically switch between receiving data from the wireless wide area network to receiving data from the wireless local area network.

Accordingly, the stations (e.g., the stations 124, 125), the access points (e.g., the access points 102, 104), and the base stations (e.g., base stations 106, 108) may undergo automated setup or configuration changes for establishing communications with the SON controller 156 to modify setup and operation of wireless networks especially in the context of combined control of wireless local area network access points and wireless wide area network base stations.

Figure 2:
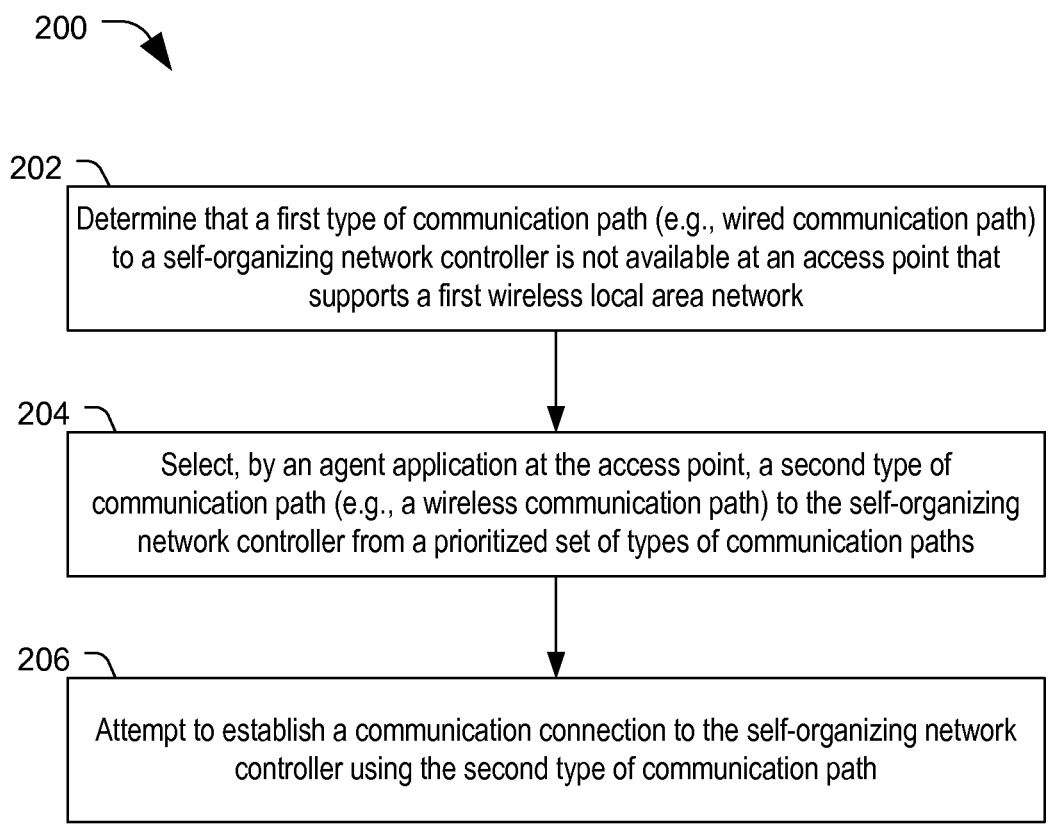
FIG. 2 is a flowchart of a particular embodiment of a method of automatically establishing communications from an access point to a SON controller.

Referring to FIG. 2, a flowchart of a particular embodiment of a method of automatically establishing communications from an access point to a SON controller is disclosed and generally designated 200. The method 200 includes, at 202, determining that a first type of communication path to a self-organizing network controller is not available at an access point that supports a first wireless local area network. Types of communication paths may include communication paths associated with a wireline connection, a wireless connection, a base station connection, an access point connection, or any combination thereof. For example, in FIG. 1, the first access point 102 may determine that the communication path 170 associated with the wireline connection 118 to the SON controller 156 is not available. To illustrate, the SON connection controller 142 may determine that no Ethernet connection is coupled to an Ethernet communication interface of the set of communication interfaces 132. After determining that the first type of communication path is not available, the method 200 may include, at 204, selecting by an agent application at the access point 102, a second type of communication path to the self-organizing network controller from a prioritized set of types of communications paths. For example, based on determining that the communication path 170 associated with the wireline connection 118 is not available, the SON connection controller 142 may access the prioritized communications paths 146 and select a second communication path. For example, the second communication path may include a wireless wide area communication path associated with the wireless connection 176 to the first base station 106 or a wireless local area communication path associated with the wireless connection 178 to the second access point 104.

After selecting the second type of communication path, the method 200 may include, at 206, attempting to establish a communication connection to the self-organizing network controller using the second type of communication path. For example, after the SON connection controller 142 selects a second communication path type from the prioritized communication paths 146, the agent application 140 may utilize a corresponding communication interface 132 to attempt to establish the communication connection (e.g., the connection associated with the communication path 174 or the connection associated with the communication path 180) to the SON controller 156 in order to transmit information associated with the access point 102 (e.g., as the information 182) to the SON controller 156. Accordingly, the method 200 enables an access point to automatically establish a communication connection to a SON controller in order to facilitate configuration of a wireless local area network (e.g., by receiving control data including configuration information from the SON controller 156).

Figure 3:
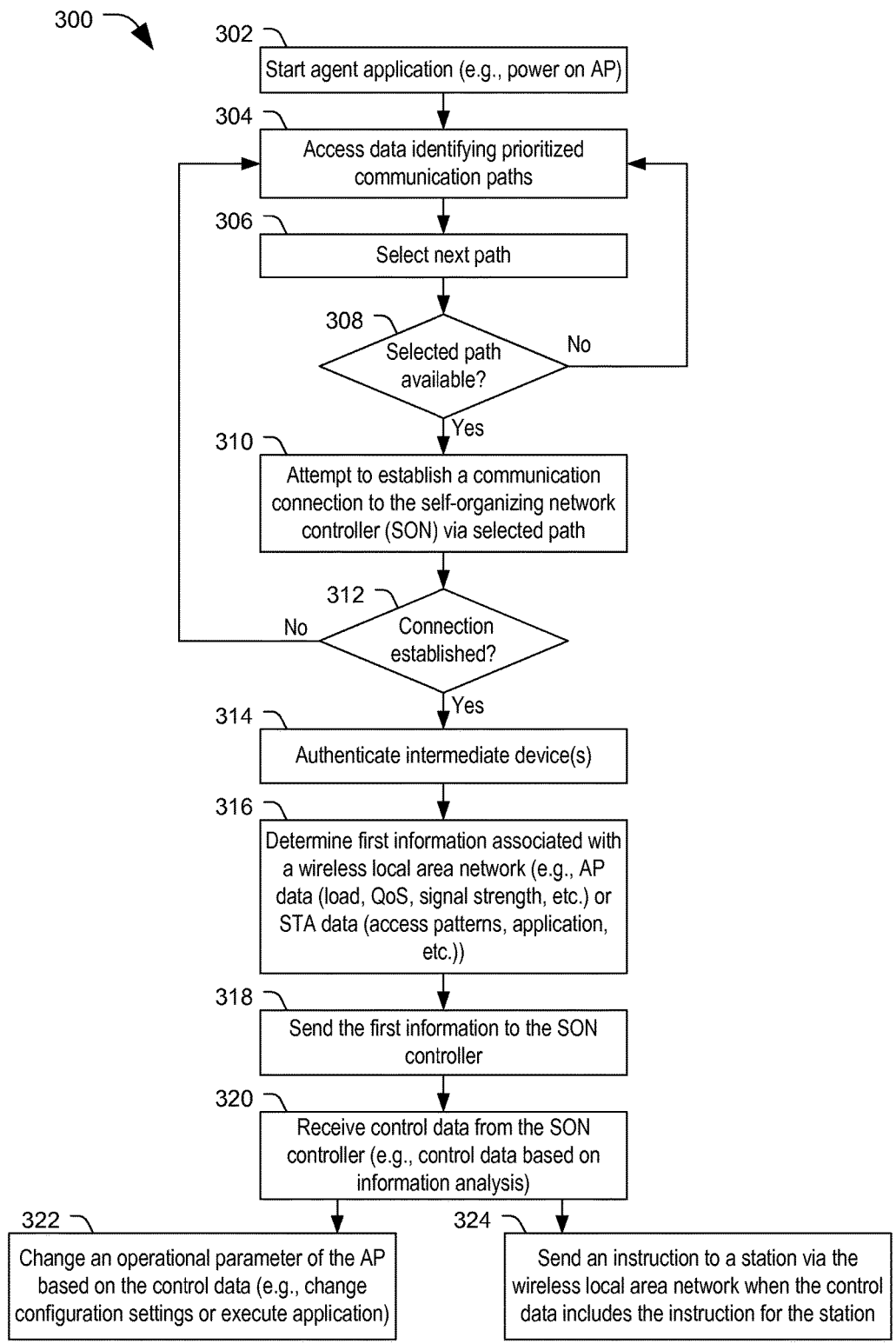
FIG. 3 is a flowchart of a second particular embodiment of a method of establishing communications from an access point to a SON controller.

Referring to FIG. 3, a flowchart of a second particular embodiment of a method of establishing communications from an access point to a SON controller is disclosed and generally designated 300. The method 300 includes, at 302, starting an agent application. For example, the agent application may be started at power-on of an access point. To illustrate, the access point 102 of FIG. 1 may start the agent application 140 at power-on of the access point 102 or in response to a user input.

The method 300 also includes, at 304, accessing data identifying prioritized communication paths. For example, the SON connection controller 142 of FIG. 1 may access the prioritized communication paths 146 from the memory 134 of the access point 102. The prioritized communication paths 146 may indicate a prioritized set of communication paths to be utilized by the access point 102 to set up communications with the SON controller 156.

The method 300 also includes, at 306, selecting a next communication path from the prioritized communication paths and, at 308, determining whether the selected path is available. For example, when the first path in the prioritized communication paths 146 is a wired communication path (e.g., communication path 170), after the wired communication path is selected, the access point 102 may determine whether the wired communication path associated with the wireline connection 118 is available. When the selected communication path is not available, the method 300 may include accessing the data identifying the prioritized communication paths again, at 304, and selecting a next communication path from the prioritized communication paths, at 306. When the selected communication path is available, the method 300 includes, at 310, attempting to establish a communication connection to the self-organizing network controller via the selected path, at 310. For example, when the wired communication path associated with the wireline connection 118 is available to the access point 102, the SON connection controller 142 may attempt to establish communications via the communications path 170 via the wireline connection 118 to the SON controller 156. Similarly, when the wired communication path associated with the wireline connection 118 is not available, based on the prioritized communication paths 146, the access point 102 may attempt to establish a second communication path 174 via the first base station 106. When the second communication path 174 is not available (e.g., when the base station 106 does not accept the access point's requests to establish the communication connection), the access point 102 may attempt to establish the third communication path 180 via the second access point 104.

After the attempt to establish the communication connection to the SON controller via the selected path, the method 300 may include determining whether the connection was established, at 312. When the connection was not established via the selected communication path, the method 300 includes accessing the data identifying the prioritized communication paths, at 304, and selecting a next communication path from the prioritized list of communication paths, at 306. When the communication connection was established, at 312, the method 300 may include, at 314, attempting to authenticate intermediate devices on the communication path. For example, when the access point 102 establishes the third communication path 180 via the second access point 104, the access point 102 may attempt to authenticate the second access point 104 by accessing an authentication server 154 of the provider systems 116.

The method 300 may also include, at 316, determining first information associated with a wireless local area network supported by the access point. For example, the first information may include access point data indicating load or demand associated with the wireless local area network, quality of service parameters associated with the wireless local area network, signal strength of signals received at the access point, signal strength of signals transmitted by the access point and received by the station, etc. As another example, the first information may include station data, such as access patterns of stations (e.g., whether the station tends to stream media) associated with the wireless local area network, applications executed by the stations (e.g., voice applications, media applications, messaging applications, etc.) associated with the wireless local area network, etc. In some embodiments, the first information includes both the access point data and the station data.

The method 300 may also include, at 318, sending the first information to the SON controller. For example, the information 182 may be sent from the access point 102 via the established communication connection and associated communication path (e.g., the communication path 170, 174, or 180) to the SON controller 156. The SON controller 156 may be configured to receive the first information and to receive second information associated with a base station of a wireless wide area network. In a particular embodiment, the SON controller 156 may be configured to receive third information associated with other wireless local area networks supported by a plurality of other access points.

The method 300 may also include receiving control data from the SON controller, at 320. For example, the SON controller 156 may analyze the information 182, which may include information from the access point 102 (e.g., first information), information from base stations (e.g., second information associated with the base station 106 or the base station 108), information from other access points (e.g., third information associated with the second access point 104), and information from one or more stations (e.g., the stations 124, 125). Analysis of the information 182 by the SON controller 156 may include performance analysis of devices (e.g., access points, base stations, or stations) or of networks (e.g., a wireless wide area network or a wireless local area network) associated with the SON controller 156. The SON controller 156 may determine operations to be performed by devices associated with the SON controller 156 or settings to be implemented by devices associated with the SON controller 156. For example, device settings to be implemented may include transmitter or transceiver power settings, communication protocol settings, beam-forming settings, data-communication rate settings, security or encryption settings, device initialization settings, etc. Based on the determinations by the SON controller 156, devices associated with the SON controller 156, such as one or more access points, one or more base stations, or one or more stations, may receive control data 184 from the SON controller 156.

In a particular embodiment, the control data 184 may include one or more operational parameters associated with the access point. In this example, the method 300 may include, at 322, changing an operational parameter of the access point based on the control data. For example, configuration settings associated with the access point may be changed or an application at the access point may be executed. To illustrate, in response to the control data 184, the access point 102 may change one or more settings 148 at the access point 102, may execute an application 138 (e.g., a transcoding application) at the access point 102, or both. For example, the access point 102 may have a data-communication parameter configured to allow the access point 102 to transmit data at a first data rate to the station 124 that can receive the data at the first data rate. The access point 102 may transmit data to a second station 125 at the first data rate that is faster than a rate the data can be received by the second station 125. Based on the control data 184, the access point 102 may change its data-communication parameter or may execute an application to modify the transmission rate of the data transmitted to the second station 125. Changes to one or more operational parameters associated with the access point 102 based on the control data 184 may enable automatic setup of the access point 102 and allow improved control by the SON controller 156 of the performance of the wireless local area network associated with the access point 102. Network performance of the wireless local area network associated with the SON controller 156 may be modified to compensate for the network performance of a wireless wide area network that is also associated with the SON controller 156.

As another example, the control data 184 may include one or more instructions for a station (e.g., the station 124) coupled to the access point (e.g., the access point 102). The instructions for the station may be in the form of one or more commands, or station parameters. In this example, the method 300 may include, at 324, sending instructions from the access point 102 to the station 124 via the wireless local area network. For example, when the control data 184 includes an instruction for the station 124, the access point 102 may send the instruction via a wireless connection 126 over the wireless local area network supported by the access point 102. To illustrate, the station 124 may process data at a rate that is faster than its current data transmission rate. In response to an instruction received from the access point 102 based on the control data 184, the station may change a data-communication parameter of the station 124 or may execute an application at the station 124 to modify the data transmission rate of the station 124 (e.g., to increase the rate) to better match the processing needs of the station 124. As a further illustration, in response to an instruction received from the access point 102 based on the control data 184, the station 124 may modify a configuration setting of the station 124, may join a second wireless local area network associated with a second access point 104, may join the wireless wide area network, may terminate an application executing at the station 124, may execute an application at the station 124, or may change a setting associated with the application.

Accordingly, the access point 102 may undergo automated setup or configuration for establishing communications with a SON controller, improve setup and operation of wireless local area networks, especially in the context of combined control of wireless local area network hotspots or access points and wireless wide area network base stations.

Figure 4:
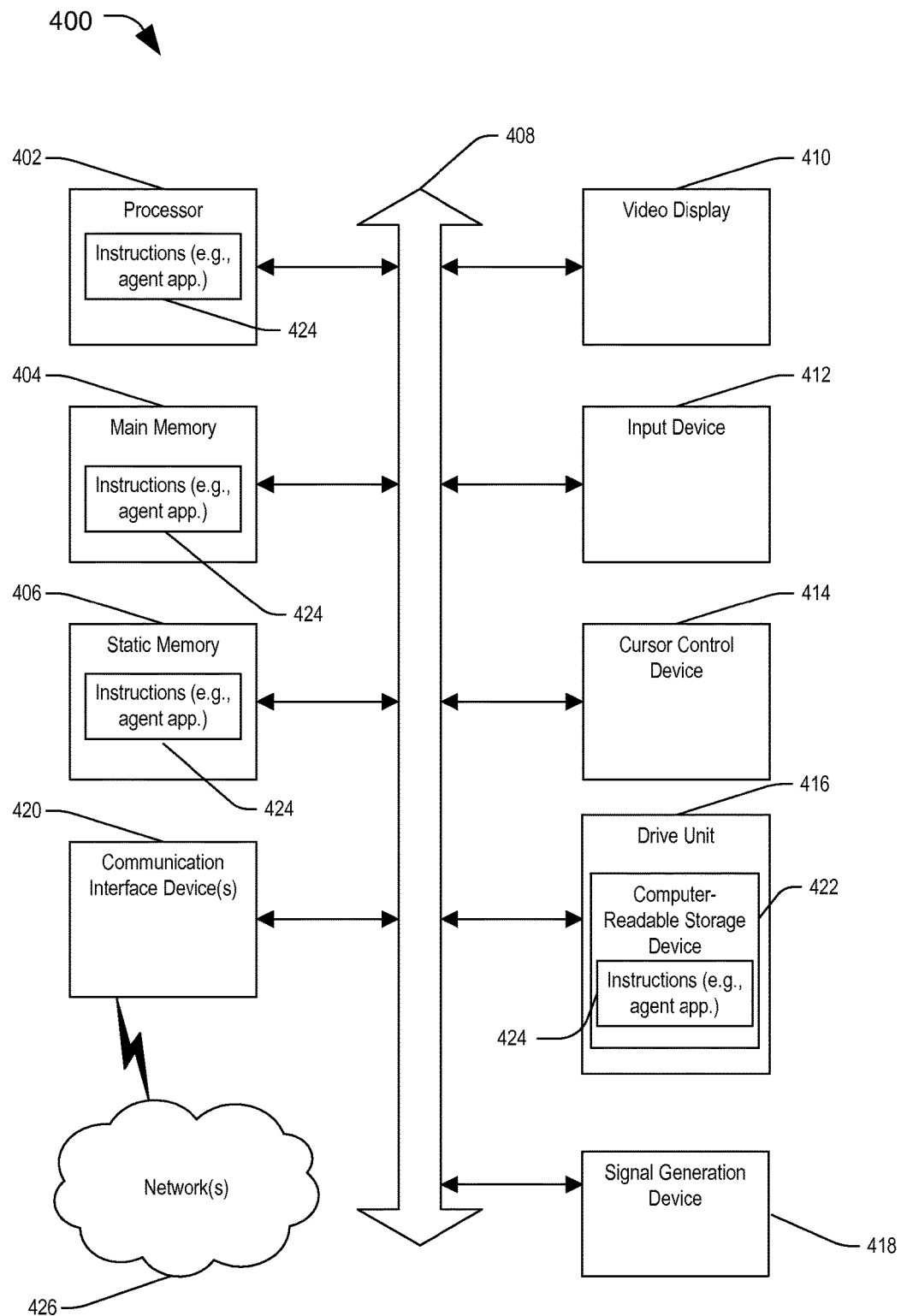
FIG. 4 is a block diagram of a particular embodiment of a computer system that includes an agent application to establish communications from an access point to a SON controller.

Referring to FIG. 4, a block diagram of a particular embodiment of a computer system that includes an agent application to establish communications from an access point to a SON controller is disclosed and generally designated 400. The computer system 400 may include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. For example, the computer system 400 may include, may be included within, or may correspond to one or more of the components of the system 100, the provider systems 116 of FIG. 1, the base stations 106 and 108 of FIG. 1, the access points 102 and 104 of FIG. 1, the stations 124 and 125, or a combination thereof described with reference to FIG. 1.

In a networked deployment, the computer system 400 may operate in the capacity of a server or as a client user computer in a server-client user network environment, or as a peer computer system in a peer-to-peer (or distributed) network environment, or as a device operating within the network 114 (e.g., one or more wireless wide area networks and one or more wireless local area networks). The computer system 400 may also be implemented as or incorporated into various other devices, such as a personal computer (PC), a tablet PC, a wireless set-top box (STB), a personal digital assistant (PDA), a customer premises equipment device, an endpoint device, a mobile device, a palmtop computer, a laptop computer, a desktop computer, a communications device, a wireless telephone, or any other machine capable of executing a set of instructions (sequential or otherwise) that specify actions to be taken by that machine. In a particular embodiment, the computer system 400 may be implemented using electronic devices that provide video, audio, or data communication. Further, while one computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 includes a processor 402, e.g., a central processing unit (CPU), a graphics processing unit (GPU), or both. The processor 402 may be one or more components (e.g., a processor) of the provider systems 116, one or more components (e.g., a processor) of the base stations 106 and 108, one or more components (e.g., a processor) of the access points 102 and 104, or one or more components (e.g., a processor) of the stations 124 and 125. In a particular embodiment, the processor 402 may include multiple processors. For example, the processor 402 may include distributed processors, parallel processors, or both. The multiple processors may be included in, or coupled to, a single device or multiple devices. The processor 402 may include a virtual processor. In a particular embodiment, the processor 402 may include a state machine, an application specific integrated circuit (ASIC), or a programmable gate array (PGA) (e.g., a field programmable gate array (FPGA)).

Moreover, the computer system 400 may include a main memory 404 and a static memory 406, which can communicate with each other via a bus 408. For example, the main memory 404 may be one or more components (e.g., a memory) of the provider systems 116, one or more components (e.g., a memory) of the base stations 106 and 108, one or more components (e.g., a memory) of the access points 102 and 104, or one or more components (e.g., a memory) of the stations 124 and 125. As shown, the computer system 400 may further include a video display unit 410, such as a liquid crystal display (LCD), a flat panel display, or a solid state display. Additionally, the computer system 400 may include an input device 412, such as a keyboard, a touch screen, and a cursor control device 414, such as a mouse. The computer system 400 may also include a drive unit 416, a signal generation device 418, such as a speaker or remote control, and a communication interface device(s) 420, such as communication interface device(s) associated with the communication interfaces 132. The computer system 400 may not include an input device (e.g., a server may not include an input device).

In a particular embodiment, as depicted in FIG. 4, the drive unit 416 may include a computer-readable storage device 422 in which one or more sets of instructions 424 (e.g. an agent application), can be embedded. The computer-readable storage device 422 may be random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or processor. The computer-readable storage device is an article of manufacture. The computer-readable storage device is a physical device and is not a signal. Further, the instructions 424 may embody one or more of the methods or logic as described herein. The instructions 424 may be executable by the processor 402 to perform one or more functions or methods described herein, such as the methods described with reference to FIG. 2 or FIG. 3. In a particular embodiment, the instructions 424 may reside completely, or at least partially, within the main memory 404, the static memory 406, and/or within the processor 402 during execution by the computer system 400. The processor 402 may execute the instructions 424 to perform operations corresponding to one or more of the methods as described herein. The processor 402 may perform the operations directly, or the processor 402 may facilitate, direct, or cooperate with another device or component to perform the operations In an alternative embodiment, dedicated hardware implementations, such as application specific integrated circuits, programmable logic arrays and other hardware devices, may be constructed to implement one or more of the methods described herein. Various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing. Alternatively, virtual computer system processing may be constructed to implement one or more of the methods or functionality as described herein.

The present disclosure includes a computer-readable storage device 422 that stores the instructions 424 or receives, stores, and executes the instructions 424, so that a device connected to a network 426 may communicate voice, video, or data over the network 426. The network 426 may include the network 114 (e.g., a network in communication with one or more wireless wide area networks and one or more wireless local area networks). The computer-readable storage device 422 device may include or may be included within one or more of the components of the provider systems 116, one or more components of the base stations 106 and 108, one or more components of the access points 102 and 104, one or more components of the stations 124 and 125, or a combination thereof described with reference to FIG. 1. While the computer-readable storage device 422 is shown to be a single device, the computer-readable storage device 422 may include multiple devices. The computer-readable storage device 422 is capable of storing a set of instructions for execution by a processor to cause a computer system to perform any one or more of the methods or operations disclosed herein.

In a particular non-limiting, exemplary embodiment, the computer-readable storage device 422 may include a solid-state memory such as a memory card or other package that houses one or more non-volatile read-only memories. Further, the computer-readable storage device 422 may be a random access memory or other volatile re-writable memory. Additionally, the computer-readable storage device 422 may include a magneto-optical or optical device, such as a disk or tapes or other storage device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   after determining that a first communication path to a self-organizing network controller is not available at an access point that supports a first wireless local area network, selecting, by an agent application at the access point, a second communication path to the self-organizing network controller from a prioritized set of communication paths, wherein the self-organizing network controller is configured to offload a portion of traffic handled by a base station of a wireless wide area network to the access point based on information received from the access point via a communication connection, wherein the self-organizing network controller is remote from the base station and the access point, wherein the first communication path does not include the base station, and wherein the second communication path includes the base station;
   attempting to facilitate establishment of the communication connection to the self-organizing network controller using the second communication path;
   after the communication connection is established, receiving by the agent application, control data from the self-organizing network controller, wherein the control data includes an instruction for a station in communication with the access point via the first wireless local area network; and
   sending the instruction to the station from the access point, wherein the instruction is executable by the station to cause the station to modify a data transmission rate of the station.

2. The method of claim 1, wherein the first communication path is a wired communication path.

3. The method of claim 2, wherein the second communication path is a wireless communication path via a wireless wide area network.

4. The method of claim 1, further comprising, if an attempt to establish the communication connection is unsuccessful:
- selecting, by the agent application, a third communication path to the self-organizing network controller from the prioritized set of communication paths, wherein the third communication path includes a second access point and does not include the base station; and
- attempting to establish a second communication connection to the self-organizing network controller using the third communication path.

5. The method of claim 1, wherein the self-organizing network controller is a component of a system that provides network access to the base station and the access point.

6. The method of claim 1, further comprising:
- determining, by the agent application, first information associated with the first wireless local area network; and
- after establishing the communication connection, sending the first information to the self-organizing network controller.

7. The method of claim 6, wherein the self-organizing network controller is configured to receive the first information and to receive second information associated with the base station of the wireless wide area network, and wherein the control data is generated by the self-organizing network controller based on the first information and the second information.

8. The method of claim 6, wherein the first information includes station data, and wherein the station data includes information descriptive of access patterns of stations associated with the first wireless local area network, information descriptive of applications used at the stations associated with the first wireless local area network, or any combination thereof.

9. The method of claim 7, wherein the control data is generated further based on third information received by the self-organizing network controller from agent applications at a plurality of other access points, wherein the third information is associated with other wireless local area networks supported by the plurality of other access points.

10. The method of claim 7, wherein the self-organizing network controller performs an analysis of the first information and the second information and selects first operational parameters for the access point and second operational parameters for the base station based on the analysis, wherein the control data indicates the first operational parameters, and further comprising changing an operational parameter of the access point based on the control data.

11. The method of claim 7, wherein the instruction is executable by the station to cause the station to join a second wireless local area network associated with a second access point, to cause the station to join the wireless wide area network, to cause the station to leave the first wireless local area network, to cause the station to terminate an application executing at the station, to cause the station to execute the application at the station, to cause the station to change a setting associated with the application, or a combination thereof.

12. The method of claim 10, wherein the operational parameter includes a configuration setting of the access point.

13. The method of claim 10, wherein the changing the operational parameter includes executing an application at the access point.

14. A computer readable storage device storing instructions that are executable by a processor to cause the processor to execute an agent application to perform operations, the operations including:
- after determining that a first communication path to a self-organizing network controller is not available at an access point that supports a first wireless local area network, selecting, at the access point, a second communication path to the self-organizing network controller from a prioritized set of communication paths, wherein the self-organizing network controller is configured to offload a portion of traffic handled by a base station of a wide area network to the access point based on information received from the access point via a communication connection, wherein the self-organizing network controller is remote from the base station and the access point, wherein the first communication path does not include the base station, and wherein the second communication path includes the base station;
- attempting to facilitate establishment of the communication connection to the self-organizing network controller using the second communication path;
- after the communication connection is established, receiving by the agent application, control data from the self-organizing network controller, wherein the control data includes an instruction for a station in communication with the access point via the first wireless local area network; and
- sending the instruction to the station from the access point, wherein the instruction is executable by the station to cause the station to modify a data transmission rate of the station.

15. The computer readable storage device of claim 14, wherein the operations further comprise:
- determining first information associated with the first wireless local area network;
- after establishing the communication connection, sending the first information to the self-organizing network controller, wherein the self-organizing network controller is configured to receive the first information and to receive second information associated with a base station of a wireless wide area network; and
- changing an operational parameter of the access point based on the control data.

16. The computer readable storage device of claim 15, wherein the first wireless local area network is supported according to an Institute of Electrical and Electronics Engineers 802.11 specification, and wherein the base station supports the wireless wide area network according to a 3rd Generation Partnership Project Long-Term Evolution specification or a 3rd Generation Partnership Project Evolved Universal Terrestrial Access Network specification.

17. An access point device comprising:
- a plurality of communication interfaces, wherein a first communication interface of the plurality of communication interfaces supports communications via a first communication path and a second communication interface of the plurality of communication interfaces supports a first wireless local area network;
- a processor coupled to the plurality of communication interfaces; and a memory accessible by the processor, the memory storing instructions executable by the processor to execute an agent application to perform operations, the operations including:
- after determining that the first communication path to a self-organizing network controller is not available, selecting, by the agent application, a second communication path to the self-organizing network controller from a prioritized set of types of communication paths, wherein the self-organizing network controller is configured to offload a portion of traffic handled by a base station of a wide area network to the access point device based on information received from the access point device via a communication connection, wherein the self-organizing network controller is remote from the base station and the access point device, wherein the first communication path does not include the base station, and wherein the second communication path includes the base station;
- attempting to facilitate establishment of a communication connection to the self-organizing network controller using the second communication path;
- after the communication connection to the self-organizing network controller is established, receiving by the agent application, control data from the self-organizing network controller, wherein the control data includes an instruction for a station in communication with the access point device via the first wireless local area network; and
- sending the instruction to the station from the access point device, wherein the instruction is executable by the station to cause the station to modify a data transmission rate of the station.

18. The access point device of claim 17, wherein the operations further comprise:
- determining first information associated with the first wireless local area network;
- after establishing the communication connection to the self-organizing network controller, sending the first information to the self-organizing network controller, wherein the self-organizing network controller is configured to receive the first information and to receive second information associated with a base station of a wireless wide area network; and
- changing an operational parameter of the access point device based on the control data.

* * * * *